US012722808B2

(12) United States Patent
Tok

(10) Patent No.: US 12,722,808 B2
(45) Date of Patent: Sep. 1, 2026

(54) THERMAL PROTECTION SYSTEM

(71) Applicant: Tusas—Turk Havacilik Ve Uzay Sanayii Anonim Sirketi, Kahramankazan (TR)

(72) Inventor: Furkan Ahmet Tok, Kahramankazan (TR)

(73) Assignee: Tusas—Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 0 days.

(21) Appl. No.: 19/107,179

(22) PCT Filed: Aug. 21, 2023

(86) PCT No.: PCT/TR2023/050837
§ 371 (c)(1),
(2) Date: Feb. 27, 2025

(87) PCT Pub. No.: WO2024/049385
PCT Pub. Date: Mar. 7, 2024

(65) Prior Publication Data

US 2026/0070679 A1 Mar. 12, 2026

(30) Foreign Application Priority Data

Aug. 31, 2022 (TR) .............................. 2022/013588

(51) Int. Cl.
*B64G 1/58* (2006.01)
*B64G 1/44* (2006.01)

(52) U.S. Cl.
CPC *B64G 1/58* (2013.01); *B64G 1/44* (2013.01)

(58) Field of Classification Search
CPC .......... B64G 1/58; B64G 1/44; B64G 1/2224; B64G 1/2225; B64G 1/407
See application file for complete search history.

(56) References Cited

U.S. PATENT DOCUMENTS 3,384,324 A * 5/1968 O'Sullivan, Jr. ........ B64G 1/54 359/241
3,477,662 A * 11/1969 Anderson ............ B64G 1/2227 244/172.6

(Continued)

FOREIGN PATENT DOCUMENTS

DE 2343016 2/1975
KR 10-2010-0034501 4/2010

OTHER PUBLICATIONS

International Search Report and the Written Opinion Dated Dec. 7, 2023 From the International Searching Authority Re. Application No. PCT/TR2023/050837. (12 Pages).

(Continued)

*Primary Examiner* — Medhat Badawi

(57) ABSTRACT

The present invention comprises a source (S) generating heat and/or radiation; a body (2) located on a space vehicle; at least one avionics chamber (A) on the body (2), in which the avionics equipment is provided; at least one panel (P) outside the body (2), which extends outward from the body (2) and stores the flux from the source (S); at least one shield (3) on the body (2), which at least partially covers the surface of the body (2) to protect the body (2) from the energy provided by the source (S).

11 Claims, 4 Drawing Sheets

(56) References Cited

U.S. PATENT DOCUMENTS 4,295,706 A * 10/1981 Frost .................... G03B 11/045 359/611
4,314,682 A * 2/1982 Barnett .................. B64G 99/00 244/121
4,847,506 A * 7/1989 Archer ..................... B64G 1/54 343/873
5,044,579 A * 9/1991 Bernasconi .......... B64G 1/2227 285/133.11
5,080,306 A * 1/1992 Porter ..................... B32B 15/18 428/920
5,161,756 A * 11/1992 Redmon, Jr. ............ B64G 1/64 244/121
5,189,554 A * 2/1993 Vanasse ............. G02B 27/0994 359/530
5,305,971 A * 4/1994 Decanini ................ B64G 1/407 244/172.7
5,474,262 A * 12/1995 Fiore ........................ B64G 1/22 244/159.4
5,527,001 A * 6/1996 Stuart .................. B64G 1/2224 244/172.6
5,609,315 A * 3/1997 Lepore, Jr. ............... B64G 1/58 428/473.5
5,716,030 A * 2/1998 LaFiandra ................ B64G 1/66 250/214 PR
5,853,151 A * 12/1998 Cussac ..................... B64G 1/58 102/386
6,199,988 B1 * 3/2001 Krawczyk ............. B64G 1/361 359/604
6,481,671 B1 * 11/2002 Blair ........................ B64G 1/50 244/164
6,508,036 B1 * 1/2003 Cadogan .............. B64G 1/2227 52/750
6,568,640 B1 * 5/2003 Barnett ................ B64G 1/2227 244/172.6
6,735,920 B1 * 5/2004 Cadogan ................ H01Q 1/288 52/646
6,739,555 B2 * 5/2004 Mazanek ............. B64G 1/1081 244/172.4
7,166,825 B1 * 1/2007 Smith .................. G01N 21/274 250/203.4
7,401,752 B2 * 7/2008 Lundgren ................ B64G 1/52 244/173.1
7,413,148 B2 * 8/2008 Behrens ................... B64G 1/64 244/172.3
7,559,508 B1 * 7/2009 Taylor .................... B64G 1/002 244/172.3
7,559,509 B1 * 7/2009 Kistler ................... B64G 1/002 244/172.3
7,837,154 B2 * 11/2010 Trabandt ................ B64G 1/623 244/172.6
8,196,868 B2 * 6/2012 Kutter .................. B64G 1/2227 244/172.3
8,196,869 B2 * 6/2012 Kutter .................. B64G 1/2227 244/172.3
9,550,584 B1 * 1/2017 Harvey ................ B64G 1/2223
9,676,499 B2 * 6/2017 Myers .................. B64G 1/2227
9,815,576 B2 * 11/2017 Bullard .................. B64G 1/546
9,897,723 B2 * 2/2018 Dailey ................... G02B 23/00
10,189,583 B2 * 1/2019 Abrams ............... B64G 1/2229
10,763,569 B2 * 9/2020 Harvey ................ H01Q 1/1235
10,773,833 B1 * 9/2020 Harvey .................. B64G 1/443
11,014,693 B2 * 5/2021 Francis .................... B64G 1/44
11,036,068 B2 * 6/2021 Hu ........................ G02F 1/0147
11,724,827 B2 * 8/2023 Sathyanarayan .... B64G 1/4024 244/172.5
11,724,828 B2 * 8/2023 Ruhl .................... B64G 1/2224 244/172.6
11,858,664 B1 * 1/2024 Shoer ..................... B64G 1/242
11,926,442 B2 * 3/2024 Bannon .................... B64G 1/54
11,958,638 B1 * 4/2024 Ratcliff .................... B64G 1/44
11,990,665 B2 * 5/2024 Ring .................... H01Q 1/1235
12,358,649 B1 * 7/2025 Tebbe .................. B64G 1/1007
12,398,704 B2 * 8/2025 Duong ................... B64G 1/506
2004/0035120 A1 * 2/2004 Brunnhofer ............... F17C 3/08 62/45.1
2004/0140402 A1 * 7/2004 Wehner .................. B64G 1/503 244/168
2004/0201896 A1 * 10/2004 Lundgren ............. G02B 23/16 359/600
2006/0076459 A1 * 4/2006 Dailey ..................... B64G 1/66 244/173.1
2007/0051854 A1 * 3/2007 Behrens ............... B64G 1/6464 244/172.3
2008/0078884 A1 * 4/2008 Trabandt ................ B64G 1/623 244/171.7
2009/0065647 A1 * 3/2009 Alis ...................... G01J 5/0205 244/171.7
2010/0187364 A1 * 7/2010 Kutter .................. B64G 1/2227 62/51.1
2010/0187365 A1 * 7/2010 Kutter .................. B64G 1/2227 62/53.2
2010/0247864 A1 * 9/2010 Kruzelecky .............. C09K 9/00 428/206
2010/0284078 A1 * 11/2010 Bertuccio ................ G03B 9/10 359/507
2011/0037003 A1 * 2/2011 Gooden ................. G02B 5/003 250/515.1
2014/0299714 A1 * 10/2014 Wong ..................... B64G 1/503 165/185
2015/0381922 A1 * 12/2015 Hamilton ............... H04N 5/655 348/837
2016/0207641 A1 * 7/2016 Myers .................. B64G 1/2227
2016/0288929 A1 * 10/2016 Smith ...................... B64G 1/58
2019/0023423 A1 * 1/2019 Grübler .................. B64G 1/425
2019/0135438 A1 * 5/2019 Stephens, Jr. .......... B64G 1/105
2020/0010221 A1 * 1/2020 Fraze ..................... B64G 1/443
2022/0048650 A1 * 2/2022 Rey .......................... B64G 4/00
2023/0150700 A1 * 5/2023 Dunn ....................... B64G 1/44 701/16

OTHER PUBLICATIONS

Nagano et al. "Development of A Lightwave Deployable/Stowable Radiator for Interplanetary Exploration", Applied Thermal Engineering, XP028270425, 31(16):3322-3331, Available Online Jun. 17, 2011.

* cited by examiner

THERMAL PROTECTION SYSTEM

RELATED APPLICATIONS

This application is a National Phase of PCT Patent Application No. PCT/TR2023/050837 having International filing date of Aug. 21, 2023, which claims the benefit of priority of Turkey Patent Application No. 2022/013588 filed on Aug. 31, 2022. The contents of the above applications are all incorporated by reference as if fully set forth herein in their entirety.

FIELD AND BACKGROUND OF THE INVENTION

The present invention relates to a thermal protection system suitable for use in air and/or space vehicles.

Communication satellites functioning in geostatic orbit (GEO) rotate in an orbit around the earth with a constant projection on the earth. During a mission, the satellite's panels, which are usually in a rare position (top panel facing the earth), are exposed to the solar flux at different angles throughout the year, including summer solstice, winter solstice and equinox. The heat load on the panels, which are constantly exposed to solar flux at these certain periods in the orbit, is released into the space environment by means of large radiator areas. Panels without a radiator area are protected by creating a radiation barrier and insulation with the help of a multi-layer insulation blanket. On the contrary, panels and equipment that are not exposed to solar flux and remain on the cold side are constantly supported by electrical heaters so as to be kept at certain temperature ranges. The problem here is that, due to the fact that the payload panels always face the same direction and the payload equipment is mostly located on the north and south oriented panels, these panels use too much heater and heater power in cold conditions.

U.S. Pat. No. 8,196,869B2, which is included in the known-state of the art, discloses a sunshield for satellites. Said shield is located on or adjacent to the equipment deck. After the depot enters orbit, the sunshield is deployed around the cryogenic tank to minimize the heat from the sun and earth, and the shield deflects the heat emitted from these sources into deep space. It is mentioned that the shield is actuated by an actuator to minimize the boiling of the liquid in the tank.

US20220048650A1, which is included in the known-state of the art, discloses an attitude control module that allows a space vehicle to control its direction relative to an inertial frame of reference or another entity such as a celestial sphere, specific areas, and nearby objects. The module located outside the space vehicle can be opened and folded. It comprises a system actuated by an actuator, which can be opened and closed circularly.

KR20100034501A, which is included in the known-state of the art, discloses a plate positioned outside a satellite body. Said structure comprises a satellite body with a cooling plate system for indirect heating of the satellite body. In order to adjust the position of the satellite body, a horizontal posture maintenance device is fixed on one end of the satellite body. It comprises a heat sink to provide radiant heat energy to the surface of the satellite body. The heat sink is the satellite body supporting the heat sink with one end separate from the surface, and the other end fixed to the horizontal position support device.

U.S. Pat. No. 9,815,576B2, which is included in the known-state of the art, discloses a sun shield designed to protect optical sensors on space vehicles from exposure to radiation. Said sun shield comprises a flat panel rotatable in two directions. The azimuth adjustment is provided by a large bearing to which the shield is hinged. The azimuth bearing extends around the opening in the enclosure. An azimuth axis around which the bearing rotates can be aligned with the sensor's field of view. A motor or another suitable device is used to rotate a part of the sun shield and bearing relative to the enclosure.

U.S. Pat. No. 7,837,154B2, which is included in the known-state of the art, discloses that a temperature in the part of the space vehicle that is exposed to the sun can reach up to 1700° C., and a sun shield is used to prevent this. The sun shield is locked using springs and bearings when it reaches a desired position in open and closed positions.

US2020010221A1, which is included in the known-state of the art, discloses to modular satellite structures. This document describes segmented (modular) satellite chassis structures for optimizing multiple satellite deployments to maximize the launch capacity of satellite systems. Thanks to this modular structure, multiple satellites can be carried more efficiently in a single rocket launch payload. The invention focuses on improving the deployment and launch efficiency of spacecraft by optimizing the geometric shapes of satellites.

DE2343016A1, which is included in the known-state of the art, includes a system that provides thermal control with electrically controlled liquid crystal materials. The color or light transmittance of the liquid crystals can be changed and this change is used to control the absorption or reflection of solar energy by a surface to provide temperature control.

US2010247864A1, which is included in the known-state of the art, aims to provide passive thermal management in space vehicles with vanadium oxide (VO2) based thermochromic materials. Thermochromic materials increase or decrease the heat emissivity of the surface by switching between low and high emissivity values within a certain temperature range.

SUMMARY OF THE INVENTION

Thanks to a thermal protection system according to the present invention, more durable and more reliable thermal protection is provided.

Another object of the present invention is to provide a lightweight thermal protection system for air and/or space vehicles.

Another object of the present invention is to provide thermal protection in a practical, effective and easy way.

The thermal protection system realized to achieve the object of the present invention, which is defined in the first claim and other claims dependent thereon, comprises a source, such as the sun, that produces heat and/or radiation. The thermal protection system comprises a body provided on a space vehicle; and an avionics chamber in the body, with avionic equipment therein. The thermal protection system comprises a plurality of panels located on the outer side of the body facing deep space to store flux from a source such as the sun. The thermal protection system comprises at least one shield located on a surface of the body interacting with the space environment, wherein the shield at least partially covers the body surface to protect the body from the energy provided by the source.

The thermal protection system according to the invention comprises the screen barriers located between the avionics chamber and the panel, close to the avionics chamber, on a surface of the panel facing the avionics chamber, wherein the screen barriers have a transparent form and an opaque form, wherein in the transparent form, the screen barriers are activated by an electric field to allow flux passage in order to keep the equipment on the hot side of the body within a temperature limit predetermined by the manufacturer, the equipment having panels which are overheated due to the solar flux reaching the satellite at different angles while the satellite is cruising on the orbit and the heat loads of the equipment placed on the panels, or having panels which are supercooled because of not being exposed to any solar flux, wherein in the opaque form, the screen barriers at least partially prevent passage of flux into the avionics chamber, wherein the screen barriers allow the equipment to be kept within a temperature limit predetermined by the manufacturer; and the shield consisting of screen barriers. Screen barriers are on the outer side of the body facing deep space.

In an embodiment of the invention, the thermal protection system comprises screen barriers made of a liquid-crystal flexible material. Screen barriers can form the main structure of the shield.

In an embodiment of the invention, the thermal protection system comprises at least one actuator that enables the shield to be opened and closed on the body. The actuator is positioned on the body. The heaters may be located on the body or on the shield.

In an embodiment of the invention, the thermal protection system comprises at least one holder extending outward from the body and allowing the shield to be held thereon. It comprises at least one sensor located in connection with the body for detecting temperature data of external environment of the space vehicle. It comprises at least one control unit that allows the execution of various commands according to the data from the sensor. By means of the thermistor data on the body, the control unit detects condition and location of the need, and the system activates to provide opening. It comprises at least one spring on the holder, which is compressed in the actuator. It comprises a first position (I) in which the screen barriers are overlapped when the spring is in the compressed position; and a second position (II), wherein at least one of the screen barriers are rotated as an accordion from the first position (I) to the second position (II) to complete one revolution around the holder when the spring, which is compressed in the actuator triggered by a command from the control unit, is released. It comprises at least one lock on the actuator, which allows the screen barriers in the second position (II) to remain fixed in the second position (II). In case of need, the system performs the first opening movement almost 90° sideways upon the command received from the control unit, and then, as a result of the release of the compressed spring system in the actuator, the screen barriers will be opened as an accordion by rotating around the body axis to complete one revolution. The first screen barrier reaching the actuator by completing the revolution will be locked by the lock structure on the actuator. According to the command from the satellite for the need, the screen barriers are activated to provide cooling. In case the need is no longer required, the lock structure will be released and the actuator will be activated, and with the release of the spring, the screen barriers will rotate in the opposite direction and fold back to the first position (I).

In an embodiment of the invention, the thermal protection system comprises at least one spring ring, which has a circular form extending outward from the body, allowing the shield to be held thereon. It comprises the first position (I) in which the screen barriers connected with the spring ring are overlapped; the second position (II), wherein at least one screen barriers is rotated as a fan from the first position (I) to the second position (II) to complete one revolution together with the spring ring when the spring ring, which is triggered by the actuator upon a command from the control unit, is released; the lock on the actuator or the shield, which allows the screen barriers in the second position (II) to remain fixed in the second position (II). In case of need, the system performs the first opening movement almost 90° sideways upon the command received from the control unit, and then, as a result of the release of the spring system compressed inside the spring ring, the screen barriers will be folded open like a fan by rotating around the body axis to complete one revolution. The first screen barrier to reach the folding motor-gear system by completing the revolution will be locked by the lock structure on the folding motor-gear system or on the main screen barrier. According to the command from the satellite for the need, the screen barriers are activated to provide cooling. In case the need is no longer required, the lock structure will be released and the actuator, which is a folding motor-gear system, will be activated, and with the release of the spring, the screen barriers will rotate in the opposite direction and will be folded back to their initial state, which is in the first position (I). The rotation axes of two reverse gears in the actuator, which is a folding motor-gear system, are positioned to be 90° to each other. The gear connected to the actuator and receiving the first driving force is fixed on the solar panel structure, while the second gear is positioned in the spring-loaded opening ring or on the first screen barrier. The dimensions of the gears can be changed according to the design. The sizes and levels of the screen barriers opened in the form of a fan can be different from each other.

In an embodiment of the invention, the thermal protection system comprises screen barriers positioned one behind the other sequentially on the shield with radial angle intervals, on the point where they are supported by the panel.

In an embodiment of the invention, the thermal protection system comprises the holder which rotates around an axis where it is connected with the panel, synchronously and concentrically with the panel. During all this operation, the thermal protection system comprises the synchronous rotation or stop of the holder and the panel structure.

In an embodiment of the invention, the thermal protection system comprises screen barriers on the body, on the same side as the side where the solar panel is attached to the body, such as north-south radiators.

In an embodiment of the invention, the thermal protection system comprises the control unit, which operates each of the screen barriers on the shield in the second position (II) simultaneously according to the data from the sensors, or allows them to operate locally according to external environmental conditions. The screen barriers can operate at the same time or can be activated separately and locally.

In an embodiment of the invention, the thermal protection system comprises at least one heater which is heated for the equipment in which the panels overheat due to the solar flux reaching the satellite at different angles while the satellite is cruising on the orbit and the heat loads of the equipment placed on the panels, or in which the panels that are not exposed to any solar flux experience supercooling, so that they are kept within temperature limits predetermined by the manufacturer, wherein the heater is located on the body, close to the avionics chamber, between the avionics chamber and the panel, on the surface of the avionics chamber facing the panel. It comprises the heater which is heated for the equipment on the farthest side from the heat flux by the source with respect to the orbital position of the space vehicle, wherein the equipment is not exposed to any heat flux and remains on the relatively cold side, wherein the heater enables the equipment to be kept within the temperature adequacy limits. The heaters are on the outer side of the body facing deep space. It comprises the shield which is positioned synchronously with the rotational movement of the space vehicle, and on which the heater strips and the screen barriers are located at least partially in contact with each other.

In an embodiment of the invention, the thermal protection system comprises heaters positioned one behind the other sequentially on the shield with radial angle intervals, on the point where they are supported by the panel. It comprises the shield which is positioned synchronously with the rotational movement of the space vehicle, and on which the heaters and the screen barriers are located at least partially in contact with each other. It comprises positioning the heater and screen barriers, respectively, one after the other sequentially at radial intervals on the shield.

In an embodiment of the invention, the thermal protection system comprises the heaters in the form of strips and/or rods, which are made of infrared strips. It comprises that the infrared heater strips with solar cells positioned on their surfaces facing deep space support the power consumption apart from the main panels.

In an embodiment of the invention, the thermal protection system comprises the body, which is a telecommunication satellite.

BRIEF DESCRIPTION OF THE SEVERAL VIEWS OF THE DRAWINGS

The thermal protection system realized to achieve the object of the present invention is illustrated in the attached figures, in which.

DESCRIPTION OF SPECIFIC EMBODIMENTS OF THE INVENTION

Figure 1:
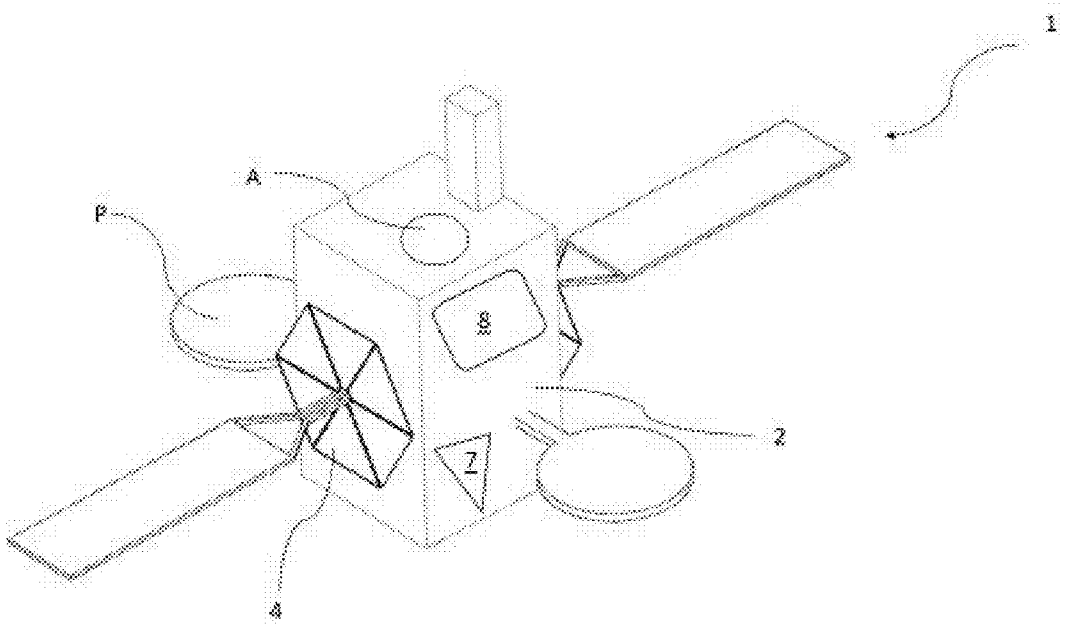
FIG. 1 is a perspective view of the thermal protection system.
Figure 2:
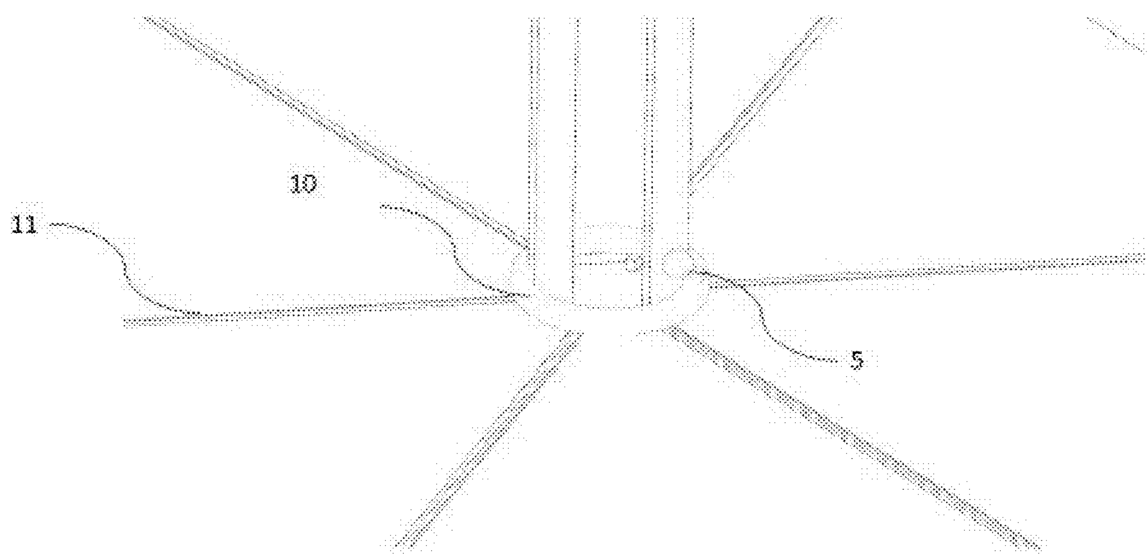
FIG. 2 is a perspective view of the spring ring, heater strip and actuator.
Figure 3:
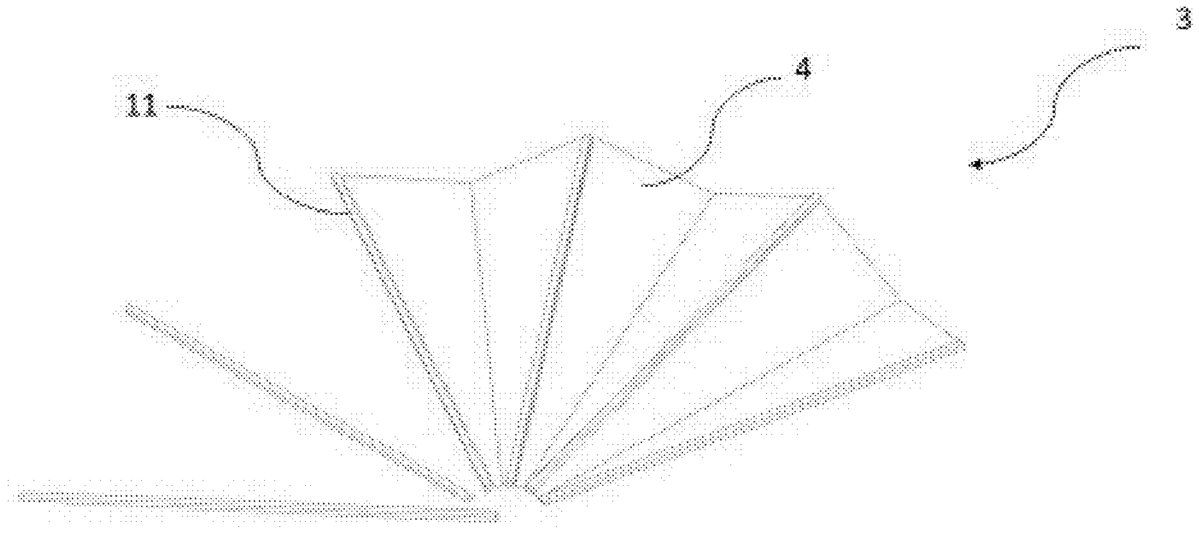
FIG. 3 is a perspective view of the shield, screen barrier and heater strip.
Figure 4:
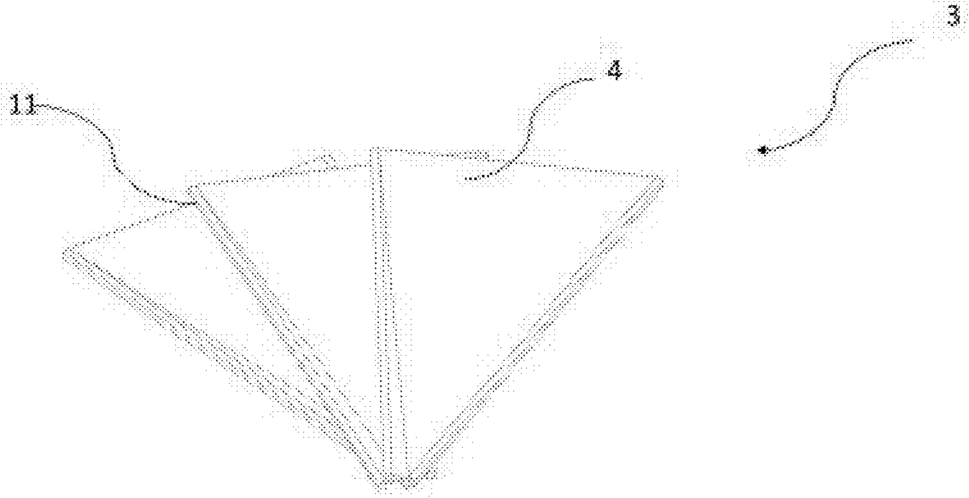
FIG. 4 is a perspective view of the shield, screen barrier and heater strip.
Figure 5:
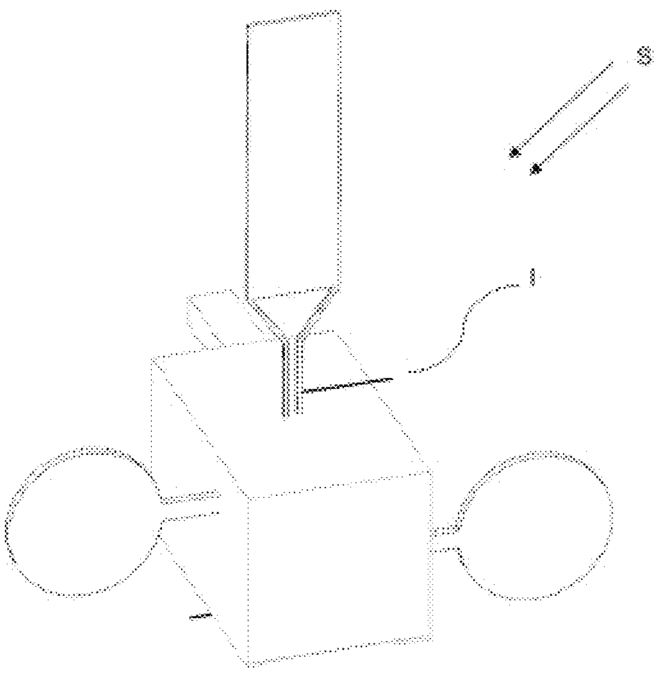
FIG. 5 is a perspective view of the first position (I).
Figure 6:
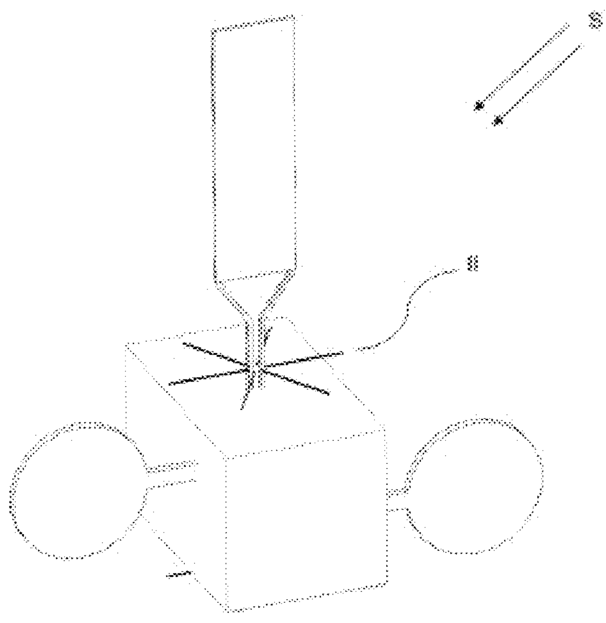
FIG. 6 is a perspective view of the second position (II).
Figure 7:
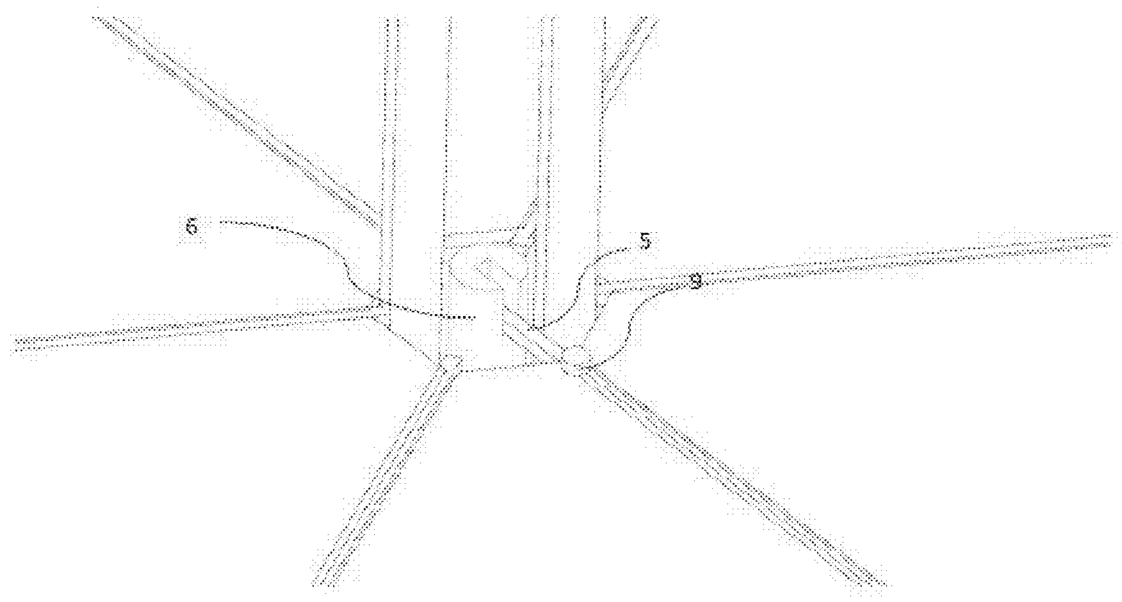
FIG. 7 is a perspective view of the holder, lock and actuator.

All the parts illustrated in figures are individually assigned a reference numeral and the corresponding terms of these numbers are listed below:

1. Thermal protection system
2. Body
3. Shield
4. Screen barrier
5. Actuator
6. Holder
7. Sensor
8. Control unit
9. Lock
10. Spring ring
11. Heater strip
(S) Source
(P) Panel
(A) Avionics chamber
(I) First position
(II) Second position It comprises a source (S) generating heat and/or radiation; a body (2) located on a space vehicle; at least one avionics chamber (A) on the body (2), in which the avionics equipment is provided; at least one panel (P) outside the body (2), which extends outward from the body (2) and stores the flux from the source (S); at least one shield (3) on the body (2), which at least partially covers the surface of the body (2) to protect the body (2) from the energy provided by the source (S).

The thermal protection system according to the invention comprises at least one screen barrier (4) which has a transparent form and an opaque form, wherein in the transparent form, the screen barrier (4) is activated by an electric field to allow flux passage in order to keep the equipment on the hot side of the body (2), with respect to the orbital position of the space vehicle, within a temperature limit predetermined by the manufacturer, wherein in the opaque form, the screen barrier (4) at least partially prevents passage of flux into the avionics chamber (A); and the shield (3) consisting of screen barriers (4).

It comprises a source (S) generating heat and/or radiation. The thermal protection system comprises a body (2) on the space vehicle; and an avionics chamber (A) in the body (2), in which the avionics equipment is provided. The thermal protection system comprises at least one panel on the body (2). The panel (P) provides storage of the flux from the source (S). Since the shield (3) is located on the wall of the body (2), the space vehicle is almost completely protected from the energy provided by the source (S). The shield (3) can be used by the user according to external environmental conditions thanks to its retractable opening mechanism.

It is provided with the screen barrier (4) which has a transparent form and an opaque form, wherein in the transparent form, the screen barrier (4) is activated by an electric field to allow flux passage in order to keep the equipment on the hot side of the body (2), with respect to the orbital position of the space vehicle, within a temperature limit predetermined by the manufacturer, the equipment having panels (P) which are overheated due to the flux coming from the orbit of the space vehicle and the heat loads of the equipment placed on the panels (P), or having panels (P) which are bot exposed to any flux, wherein in the opaque form, the screen barrier (4) at least partially prevents passage of flux into the avionics chamber (A). The screen barriers (4) are located on the surface of the avionics chamber (A) facing the panel (P), between the avionics chamber (A) and the panel (P), close to the avionics chamber (A).

In an embodiment of the invention, the thermal protection system (1) comprises the screen barrier (4) made of a liquid-crystal flexible material. Thanks to the screen barriers (4) made of a liquid-crystal material, they can be activated or deactivated by electric current, so that heat flux transfer to the body (2) is provided or prevented. The necessary heat flux prevention or heating functions are fulfilled by means of heaters (3) and liquid crystal anti-radiation screen barriers (4), thus contributing to keeping the temperatures of equipment and structural parts at desired levels.

In an embodiment of the invention, the thermal protection system (1) comprises at least one actuator (5) that actuates the shield (3) to be opened or closed on the body (2). Since the shield (3) is located on the wall of the body (2), the space vehicle is almost completely protected from the energy provided by the source (S). The shield (3) can be used by the user according to external environmental conditions thanks to its retractable opening mechanism.

In an embodiment of the invention, the thermal protection system (1) comprises at least one holder (6) extending outward from the body (2) and allowing the shield (3) to be held thereon; at least one sensor (7) connected with the body (2) for detecting data, such as temperature of the external environment of the space vehicle; at least one control unit (8) that allows the execution of various commands according to the data from the sensor (7); a first position (I) in which the screen barriers (5) are overlapped so as to be in connection with the holder (6); a second position (II), wherein at least one screen barrier (4) is rotated as an accordion from the first position (I) to the second position (II) to complete one revolution around the holder (6), when the actuator (5) is triggered by a command received from the control unit (8); at least one lock (9) on the actuator (5), which allows the screen barriers (4) in second position (II) to remain fixed in the second position (II). By means of the data obtained from the sensor (7) on the body (2), condition and location of the need are detected by the control unit (8), and the system is activated to provide opening. It comprises a first position (I) in which the screen barriers (4) are overlapped in a position where the spring is compressed in the actuator (5) positioned on the holder (6); a second position (II), wherein at least one of the screen barriers (4) is rotated as an accordion from the first position (I) to the second position (II) to complete one revolution around the holder (6) when the spring, which is compressed in the actuator (5) triggered by a command from the control unit (8), is released. Thanks to the lock (9), the screen barriers (4) are enabled to be remain fixed in the first position (I) or the second position (II).

In an embodiment of the invention, the thermal protection system (1) comprises at least one spring ring (10) which has a circular form extending outward from the body (2), allowing the shield (3) to be held thereon; the first position (I) in which the screen barriers (4) connected with the spring ring (10) are overlapped; the second position (II), wherein at least one screen barrier (4) is rotated as a fan from the first position (I) to the second position (II) to complete one revolution together with the spring ring (10) when the spring ring (10), which is triggered by the actuator (5) upon a command from the control unit (8), is released; the lock (9) on the actuator (5) or the shield (3), which allows the screen barriers (4) in the second position (II) to remain fixed in the second position (II). Thanks to the lock (9), the screen barriers (4) can remain fixed in the first position (I) or the second position (II).

In an embodiment of the invention, the thermal protection system (1) comprises screen barriers (4), each located sequentially one after the other on the shield (3) at radial intervals. Thanks to the screen barriers (4) positioned with radial angle intervals on the shield (3), wide-angle heating is provided on the body (2) surface.

In an embodiment of the invention, the thermal protection system (1) comprises the holder (6) rotating around its own axis simultaneously with the solar panel (P). The holder (6) provides a synchronous rotation or stop state with the solar panel (P) structure.

In an embodiment of the invention, the thermal protection system (1) comprises screen barriers (4) located on the body (2) on the same side as the side where the solar panel (P) is attached to the body (2). Thanks to the coated liquid crystal screen barriers (4), it is possible to control the passage of light (transparent and opaque/opaque form) by activating them with the electric field. This will prevent the panel (P) from cooling too much over the radiators by reducing the visibility of the deep space environment in the cold state in order to protect the panel (P) to which it is applied in hot condition from excessive heat flux. This protects the panel (P), to which it is applied, in the hot state from excessive heat flux, while in the cold state, it reduces the visibility of the deep space environment, thereby preventing excessive cooling of the panel (P) via the radiators.

In an embodiment of the invention, the thermal protection system (1) comprises the control unit (8), which operates each of the screen barriers (4) on the shield (3) in the second position (II) simultaneously according to the data from the sensors (7), or allows them to operate locally according to external environmental conditions. The screen barriers (4) can operate at the same time or can be activated separately and locally. In this way, the space vehicle is cooled locally, depending on the region of need.

In an embodiment of the invention, the thermal protection system (1) comprises at least one heater strip (11) that transfers heat by radiation according to the external environment data from the sensors (7) in the operational state, in order to keep the heat flux within the value predetermined by the user; the shield (3) which is positioned synchronously with the rotational movement of the space vehicle, and on which the heater strip (11) and the screen barrier (4) are located at least partially in contact with each other. The capacities of the heater strips (11) can be revised according to the design, such that they become active for the panel (P) in need of heating, and heat the panel (P) area by transferring heat by radiation. It comprises heater strips (11) with solar cells on their surface facing space.

With the command to be sent by the control unit (8) according to the need, the heat flux transmission or prevention is ensured by the screen barriers (11), which have the function of preventing radiation. It does not affect other systems since it transfers heat only by radiation during its heating function and the interior of the body (2) is isolated from the environment. The solar cells support the power consumption, apart from main solar panels (P). It comprises a plurality of heater strips (11) which are heated for the equipment in which the panels (P) overheat due to the flux coming from the orbit of the space vehicle and the heat loads of the equipment placed on the panels, or in which the panels (P) that are not exposed to any flux experience supercooling, so that they are kept within temperature limits predetermined by the manufacturer, wherein the heater strips (11) are located on the body (2), close to the avionics chamber (A), between the avionics chamber (A) and the panel (P), on the surface of the avionics chamber (A) facing the panel (P). The heater strips (11) are heated for the equipment on the farthest side from the heat flux by the source (S) with respect to the orbital position of the space vehicle, wherein the equipment is not exposed to any heat flux and remains on the relatively cold side, wherein the heater strips enable the equipment to be kept within the temperature adequacy limits. Heater strips (11) form the main frame of the anti-radiation screen barrier (4), and their capacities can be revised according to the design, such that they become active for the panel (P) in need of heating, thereby contributing to the heating of the panel (P) area by transferring heat by radiation.

In an embodiment of the invention, the thermal protection system (1) comprises the heater strip (11) and the screen barrier (4), which are each located one after the other sequentially on the shield at radial intervals. In this way, a wide-angle heating and cooling processes are provided on the body (2) surface simultaneously, according to the user's request.

In an embodiment of the invention, the thermal protection system (1) comprises the heater strip (11), which is an infrared heater. The capacities of the heater strips (11) can be revised according to the design, and they become active for the panel (P) in need of heating, thereby heating the panel (P) area by transferring heat by radiation. By means of heater strips (11) and liquid crystal anti-radiation screen barriers (4), the required heat flux blocking or heating functions are fulfilled, thus contributing to keeping the temperatures of equipment and structural parts at desired levels.

In an embodiment of the invention, the thermal protection system (1) comprises the body (2), which is a telecommunication satellite. It comprises the shield (3) comprising the screen barrier (4) and the heater strip (11), and being connected to the body (2) or located on the solar panel (P) structure at a certain height from the panels (P), on the side of North-South radiator panels (P).

The invention claimed is:

1. A thermal control system, comprising:

a body located on a space vehicle;

at least one avionics chamber on the body, avionics equipment being disposed in the at least one avionics chamber;

at least one solar panel extending outward from the body and configured to store flux from a source that generates at least one of heat and radiation;

at least one shield on the body, the at least one shield at least partially covering a surface of the body so as to protect the body from energy provided by the source; and at least one screen barrier having a transparent form and an opaque form, wherein, in the transparent form, the at least one screen barrier is activated by an electric field so as to allow passage of the flux in order to keep the avionics equipment on a hot side of the body, with respect to an orbital position of the space vehicle, within a temperature limit predetermined by a manufacturer, wherein, in the opaque form, the at least one screen barrier at least partially prevents passage of the flux into the at least one avionics chamber, and wherein the at least one shield comprises the at least one screen barrier.

2. The thermal control system according to claim 1, further comprising at least one actuator that actuates the at least one shield so as to open or close the at least one shield on the body.

3. The thermal control system according to claim 2, further comprising:

at least one spring ring having a circular form, the at least one spring ring extending outward from the body and holding the at least one shield;

at least one control unit configured to issue a command to the at least one actuator;

a first position, in which the at least one screen barrier connected with the at least one spring ring is overlapped;

a second position, in which the at least one screen barrier is rotated as a fan from the first position to the second position so as to complete one revolution together with the at least one spring ring when the at least one spring ring is released by the at least one actuator upon the command from the at least one control unit; and at least one lock on the at least one actuator or on the at least one shield, the at least one lock being configured to fix the at least one screen barrier in the second position.

4. The thermal control system according to claim 1, wherein the at least one screen barrier comprises a plurality of screen barriers located sequentially one after another on the at least one shield at radial angle intervals.

5. The thermal control system according to claim 1, wherein the at least one holder rotates around an axis of the at least one holder simultaneously with the at least one solar panel.

6. The thermal control system according to claim 1, wherein the at least one screen barrier is located on the body on a same side of the body as a side on which the at least one solar panel is attached to the body.

7. The thermal control system according to claim 1, wherein the at least one screen barrier comprises a plurality of screen barriers on the at least one shield, and wherein the at least one control unit is configured to operate the plurality of screen barriers in the second position simultaneously in accordance with the temperature data from the at least one sensor, or to allow the plurality of screen barriers to operate locally in accordance with external environmental conditions.

8. The thermal control system according to claim 1, further comprising:

at least one heater strip configured to transfer heat by radiation in accordance with the temperature data from the at least one sensor in an operational state of the thermal control system, so as to keep a heat flux within a value predetermined by a user, wherein the at least one shield is positioned synchronously with a rotational movement of the space vehicle, and wherein the at least one heater strip and the at least one screen barrier are located on the at least one shield at least partially in contact with one another.

9. The thermal control system according to claim 8, wherein the at least one heater strip and the at least one screen barrier are located one after another sequentially on the at least one shield at radial intervals.

10. The thermal control system according to claim 8, wherein the at least one heater strip is an infrared heater.

11. The thermal control system according to claim 1, wherein the body is a telecommunication satellite.

* * * * *